US009606004B2

(12) United States Patent
Hwang et al.

(10) Patent No.: US 9,606,004 B2
(45) Date of Patent: Mar. 28, 2017

(54) INFRARED RAY DETECTING APPARATUS AND HEATING COOKER HAVING THE SAME

(71) Applicant: Samsung Electronics Co., Ltd., Suwon-si (KR)

(72) Inventors: Yeon A Hwang, Suwon-si (KR); Jun hoe Choi, Suwon-si (KR); Tae Gyoon Noh, Suwon-si (KR); Jong Sung Park, Seoul (KR); Ji Hoon Ha, Suwon-si (KR); Jeong Su Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 406 days.

(21) Appl. No.: 13/742,805

(22) Filed: Jan. 16, 2013

(65) Prior Publication Data
US 2013/0248522 A1 Sep. 26, 2013

(30) Foreign Application Priority Data

Mar. 23, 2012 (KR) ........................ 10-2012-0029919

(51) Int. Cl.
*G01J 5/08* (2006.01)
*G01J 5/00* (2006.01)
*H05B 6/64* (2006.01)

(52) U.S. Cl.
CPC ........... *G01J 5/0809* (2013.01); *G01J 5/0044* (2013.01); *G01J 5/0806* (2013.01); *H05B 6/64* (2013.01); *H05B 6/6455* (2013.01)

(58) Field of Classification Search
CPC .. H05B 6/6426; H05B 6/6402; H05B 6/6429; H05B 6/6414; H05B 6/6455;
(Continued)

(56) References Cited

U.S. PATENT DOCUMENTS 3,613,659 A * 10/1971 Phillips ...................... F24J 2/02
126/573
3,703,718 A * 11/1972 Berman ................. G08B 13/19
250/338.1
(Continued)

FOREIGN PATENT DOCUMENTS

EP 0021630 1/1981

OTHER PUBLICATIONS

Australian Search Report issued Feb. 21, 2014 in Australian Patent Application 2013201822.
(Continued)

*Primary Examiner* — David Angwin
*Assistant Examiner* — Gyounghyun Bae
(74) *Attorney, Agent, or Firm* — Staas & Halsey LLP

(57) ABSTRACT

A cooking apparatus includes a body, an inner case disposed inside the body in a cooking compartment where food is being cooked, a detection hole formed at a wall of one side of the inner case, so that an infrared ray generated at the cooking compartment is released to the outside of the cooking compartment, and an infrared ray detecting apparatus including a reflecting mirror, which has a plurality of reflection surfaces and configured to change a path of an incident infrared ray, and an infrared ray sensor configured to receive the infrared ray having the path thereof changed to detect an intensity of the infrared ray, thereby reducing the size of a detection hole configured to pass the infrared ray that is generated inside the cooking compartment, so that the adverse effect caused by the leakage of a microwave is minimized.

8 Claims, 14 Drawing Sheets

(58) Field of Classification Search
CPC .... H05B 6/6411; H05B 6/6447; H05B 6/725; H05B 6/64; F24C 15/08; G01J 5/62; G01J 5/0044; G01J 5/0806; G01J 5/0809
USPC ....... 219/756, 704, 705, 709, 710, 711, 713, 219/757, 758, 490, 491, 493, 494, 751; 374/149, 121; 250/353, 342, DIG. 1
See application file for complete search history.

(56) References Cited

U.S. PATENT DOCUMENTS

| | | | | |
|---|---|---|---|---|
| 4,191,876 A * | 3/1980 | Ohkubo | ................ | G01J 5/041 |
| | | | | 219/711 |
| 4,195,913 A * | 4/1980 | Dourte | ................ | G02B 5/09 |
| | | | | 359/853 |
| 4,263,585 A * | 4/1981 | Schaefer | ................ | 340/567 |
| 4,286,134 A | 8/1981 | Nakata et al. | | |
| 4,318,089 A * | 3/1982 | Frankel | ................ | G08B 13/193 |
| | | | | 250/342 |
| 4,347,418 A * | 8/1982 | Nobue | ................ | H05B 6/6411 |
| | | | | 219/711 |
| 4,401,884 A * | 8/1983 | Kusunoki et al. | ................ | 219/492 |
| 4,461,941 A * | 7/1984 | Fukuda et al. | ................ | 219/711 |
| 4,551,711 A * | 11/1985 | Akiyama | ................ | G08B 13/19 |
| | | | | 250/342 |
| 4,617,438 A * | 10/1986 | Nakata | ................ | G01J 5/62 |
| | | | | 219/711 |
| 4,734,562 A * | 3/1988 | Amano | ................ | A47J 37/0635 |
| | | | | 219/386 |
| 4,745,284 A * | 5/1988 | Masuda | ................ | G08B 13/19 |
| | | | | 250/338.3 |
| 4,751,356 A * | 6/1988 | Fukuda et al. | ................ | 219/711 |
| 4,873,409 A * | 10/1989 | Spruytenburg | ................ | H05B 6/687 |
| | | | | 219/506 |
| 5,308,985 A | 5/1994 | Lee | | |
| 5,449,882 A * | 9/1995 | Black | ................ | B23K 26/032 |
| | | | | 219/121.74 |
| 5,530,229 A * | 6/1996 | Gong et al. | ................ | 219/711 |
| 5,589,094 A * | 12/1996 | Bu | ................ | H05B 6/6455 |
| | | | | 219/494 |
| 5,702,626 A * | 12/1997 | Kim | ................ | 219/711 |
| 5,826,982 A | 10/1998 | Schieferdecker et al. | | |
| 5,876,120 A * | 3/1999 | Lee | ................ | 374/149 |
| 5,919,389 A * | 7/1999 | Uehashi et al. | ................ | 219/711 |
| 5,986,249 A * | 11/1999 | Yoshino | ................ | H05B 6/6411 |
| | | | | 219/695 |
| 6,007,242 A * | 12/1999 | Uehashi | ................ | H05B 6/6447 |
| | | | | 374/130 |
| 6,013,907 A * | 1/2000 | Lee | ................ | 219/703 |
| 6,121,596 A * | 9/2000 | Taino et al. | ................ | 219/711 |
| 6,132,084 A * | 10/2000 | Whipple et al. | ................ | 374/131 |
| 6,229,130 B1 * | 5/2001 | Furuta | ................ | H05B 6/6455 |
| | | | | 219/494 |
| 6,262,803 B1 * | 7/2001 | Hallerman | ................ | G01N 21/8806 |
| | | | | 356/603 |
| 7,105,785 B2 * | 9/2006 | Kanzaki et al. | ................ | 219/682 |
| 7,646,522 B2 * | 1/2010 | Broome | ................ | B41J 2/471 |
| | | | | 359/205.1 |
| 7,843,632 B2 * | 11/2010 | Bowering | ................ | G02B 5/0891 |
| | | | | 250/504 R |
| 8,014,002 B2 * | 9/2011 | Keshavmurthy | .. | G01B 11/2509 |
| | | | | 356/511 |
| 2002/0122186 A1 * | 9/2002 | Igaki | ................ | G01D 5/36 |
| | | | | 356/616 |
| 2006/0139714 A1 * | 6/2006 | Gruhlke | ................ | G02B 26/0833 |
| | | | | 359/204.1 |
| 2006/0158662 A1 * | 7/2006 | Schelinski | ................ | G01B 11/24 |
| | | | | 356/602 |
| 2006/0291063 A1 * | 12/2006 | Takemoto | ................ | G11B 7/0901 |
| | | | | 359/618 |
| 2008/0037090 A1 * | 2/2008 | Miller | ................ | G02B 27/104 |
| | | | | 359/212.1 |
| 2008/0049101 A1 * | 2/2008 | Yamazaki | ................ | H04N 3/08 |
| | | | | 348/97 |
| 2008/0073484 A1 * | 3/2008 | Kane | ................ | G01S 17/023 |
| | | | | 250/201.1 |
| 2008/0137073 A1 * | 6/2008 | Furman | ................ | G01N 21/9501 |
| | | | | 356/73 |
| 2009/0097007 A1 * | 4/2009 | Tanaka | ................ | G03F 7/70075 |
| | | | | 355/67 |
| 2011/0069305 A1 * | 3/2011 | Tanitsu | ................ | G01M 11/005 |
| | | | | 356/237.2 |
| 2012/0114012 A1 * | 5/2012 | Choi | ................ | H05B 6/6455 |
| | | | | 374/121 |

OTHER PUBLICATIONS

Partial European Search Report dated May 15, 2013 in corresponding European Patent Application No. 13151756.7.
Extended European Search Report dated Aug. 9, 2013 in European Patent Application No. 13151756.7.
European Decision on Grant issued Oct. 12, 2015 in corresponding European Patent Application No. 13 151 756.7.

* cited by examiner (a)

(b)

INFRARED RAY DETECTING APPARATUS AND HEATING COOKER HAVING THE SAME

CROSS-REFERENCE TO RELATED APPLICATIONS

This application claims the priority benefit of Korean Patent Application No. 10-2012-0029919, filed on Mar. 23, 2012, in the Korean Intellectual Property Office, the disclosure of which is incorporated herein by reference.

BACKGROUND

1. Field

The following description relates to an infrared ray detecting apparatus and a heating cooker including the same.

2. Description of the Related Art

A heating cooker is an apparatus configured to cook food by increasing the temperature of the food. In general, the heating cooker includes a microwave oven configured to radiate microwave energy at food, and a gas oven and an electric oven that are configured to directly radiate heat on food. The microwave oven is an apparatus configured to cook food by use of friction heat based on the translational motion of water molecules, which are contained in the food, by radiating microwave energy, which is generated from a magnetron, at the food.

When cooking food by using the heating cooker as such, by detecting the temperature of the food, the cooking status of the food may be able to be determined. However, directly detecting the temperature of the food may be difficult while the food is being cooked. Thus, a method of detecting the intensity of an infrared ray generated from the food, and then calculating the temperature of the food using the detected intensity of the infrared ray is being used. An infrared ray sensor is generally being used to detect the intensity of the infrared ray. The infrared ray sensor is disposed around a measuring unit formed at a cooking compartment, such that a light receiving unit of the infrared ray sensor at which an infrared ray is being received faces the cooking compartment.

However, the light receiving unit of the infrared ray sensor faces the cooking compartment, and thus the light receiving unit may be contaminated by the oil or the steam that is generated from the food. In addition, in the case of the microwave oven, the microwave radiated inside the cooking compartment may be received by the light receiving unit, thereby reducing the reliability of the result of detection.

SUMMARY

Therefore, it is an aspect of the present disclosure to provide an infrared ray detecting apparatus capable of preventing a light receiving unit of an infrared ray sensor from being contaminated by the oil or the steam generated while food is being cooked by disposing the infrared ray detecting apparatus, which is configured to detect the temperature of the food, at the outside of a cooking compartment so that the infrared ray detecting apparatus may be able to receive an infrared ray generated from the food without being exposed at the cooking compartment, and also capable of reducing the interference phenomenon caused by a microwave, and a heating cooker having the same.

It is an aspect of the present disclosure to provide an infrared ray detecting apparatus capable of minimizing an adverse effect caused by the leakage of a microwave by mounting a reflecting mirror having a plurality of reflection surfaces on the infrared ray detecting apparatus to detect infrared ray signals that correspond to the reflection surface, respectively, to minimize the size of a detection hole configured to pass the infrared ray generated inside a cooking compartment to outside of the cooking compartment, and a heating cooker including the same.

It is an aspect of the present disclosure to provide an infrared ray detecting apparatus capable of enhancing an accuracy in detecting a temperature of food by mounting a reflecting mirror having a plurality of reflection surfaces to detect infrared ray signals that correspond to the reflection surfaces, respectively, so that a unit detection domain, a temperature of which is detected by one of a plurality of infrared ray detecting devices disposed inside an infrared ray sensor, becomes uniform in size, and a heating cooker including the same.

Additional aspects of the disclosure will be set forth in part in the description which follows and, in part, will be obvious from the description, or may be learned by practice of the disclosure.

In accordance with an aspect of the present disclosure, an infrared ray detecting apparatus includes a reflecting mirror and an infrared ray sensor. The reflecting mirror may have a plurality of reflection surfaces, and may be configured to change a path of an incident infrared ray. The infrared ray sensor may be configured to receive the infrared ray having the path thereof changed to detect an intensity of the infrared ray.

Each of the plurality of reflection surfaces may be a reflection surface having a constant curvature or a reflection surface having a flat surface.

Each of the plurality of reflection surfaces may be configured to change a path of an infrared ray being incident from a different infrared ray detection domain.

The reflecting mirror may be provided with a first reflection surface and a second reflection surface. An inclination and a position of each of the first reflection surface and the second reflection surface may be adjusted, so that an infrared ray being delivered from a first detection domain, which is close to the reflecting mirror, among all infrared ray detection domains, is reflected by the first reflecting mirror surface disposed at a far distance from the infrared ray sensor, and an infrared ray being delivered from a second detection domain, which is far from the reflecting mirror, among all the infrared ray detection domains, is reflected by the second reflection surface disposed at a close distance from the infrared ray sensor.

An intersection exists between a first infrared ray signal generated from the first detection domain and incident onto the first reflection surface, and an second infrared ray signal generated from the second detection domain and incident onto the second reflection surface.

The infrared ray sensor includes a light receiving unit and a plurality of infrared ray detection devices. The light receiving unit may be configured to receive the infrared ray being reflected from the plurality of reflection surfaces. The plurality of infrared ray detection devices may be disposed at a lower side of the light receiving unit, and may be configured to generate a detection output that corresponds to an intensity of the received infrared ray.

In accordance with an aspect of the present disclosure, a heating cooker includes a body, an inner case, a detection hole, and an infrared ray detecting apparatus. The inner case may be disposed inside the body in a cooking compartment at which food is being cooked. The detection hole may be formed at a wall of one side of the inner case, and configured to allow an infrared ray generated at the cooking compartment to be released to the outside of the cooking compartment. The infrared ray detecting apparatus may include a reflecting mirror, which has a plurality of reflection surfaces and is configured to change a path of an incident infrared ray, and an infrared ray sensor configured to receive the infrared ray having the path thereof changed to detect an intensity of the received infrared ray.

The detection hole may be formed through one of a left side wall, a right side wall, a rear side wall, and an upper side wall of the inner case.

Each of the plurality of reflection surfaces may be a reflection surface having a constant curvature or a reflection surface having a flat surface.

Each of the plurality of reflection surfaces may be configured to change a path of an infrared ray being incident from a different infrared ray detection domain.

The reflecting mirror may be provided with a first reflection surface and a second reflection surface, and an inclination and a position of each of the first reflection surface and the second reflection surface may be adjusted, so that an infrared ray being delivered from a first detection domain, which is close to the reflecting mirror, among all infrared ray detection domains, is reflected by the first reflecting mirror surface disposed at a far distance from the infrared ray sensor, and an infrared ray being delivered from a second detection domain, which is far from the reflecting mirror, among all the infrared ray detection domains, is reflected by the second reflection surface disposed at a close distance from the infrared ray sensor.

An intersection may exist between a first infrared ray signal generated from the first detection domain and incident onto the first reflection surface, and a second infrared ray signal generated from the second detection domain and incident onto the second reflection surface.

The infrared ray sensor includes a light receiving unit and a plurality of detection devices. The light receiving unit may be configured to receive the infrared ray being reflected from the plurality of reflection surfaces. The plurality of detection devices may be disposed at a lower side of the light receiving unit, and configured to generate a detection output that corresponds to the intensity of the received infrared ray.

As described above, a light receiving unit of an infrared ray sensor is prevented from being contaminated by the oil or the steam generated while food is being cooked by disposing the infrared ray detecting apparatus, which is configured to detect the temperature of the food, outside a cooking compartment so that the infrared ray detecting apparatus may be able to receive an infrared ray generated from the food without being exposed at the cooking compartment, and also capable of reducing the interference phenomenon caused by a microwave.

In addition, an adverse effect caused by the leakage of a microwave is minimized by mounting a reflecting mirror having a plurality of reflection surfaces on the infrared ray detecting apparatus to detect infrared ray signals that correspond to the reflection surface, respectively, to minimize the size of a detection hole configured to pass the infrared ray generated inside a cooking compartment to the outside of the cooking compartment.

In addition, an accuracy in detecting a temperature of food is enhanced by mounting a reflecting mirror having a plurality of reflection surfaces to detect infrared ray signals that correspond to the reflection surfaces, respectively, so that a unit detection domain, a temperature of which is detected by one of a plurality of infrared ray detecting devices disposed inside an infrared ray sensor, becomes uniform in size.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
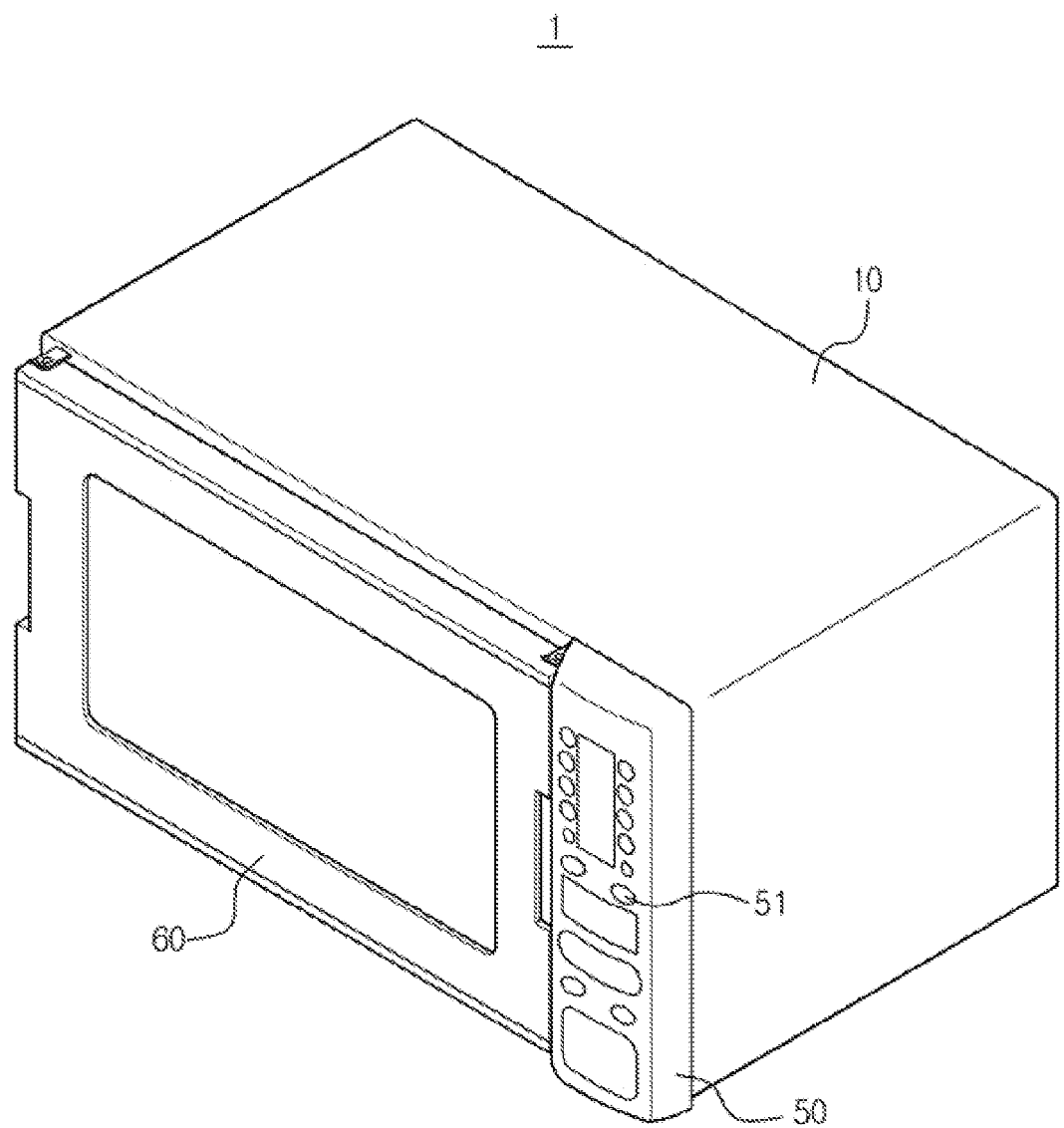
FIG. 1 is a perspective view showing an exterior appearance of a microwave oven applied with an infrared ray detecting apparatus in accordance with an embodiment of the present disclosure.

Reference will now be made in detail to the embodiments of the present disclosure, examples of which are illustrated in the accompanying drawings, wherein like reference numerals refer to like elements throughout.

The present disclosure may be applied to all heating cookers provided with a cooking compartment. Hereinafter, a microwave oven will be described as an example.

Figure 2:
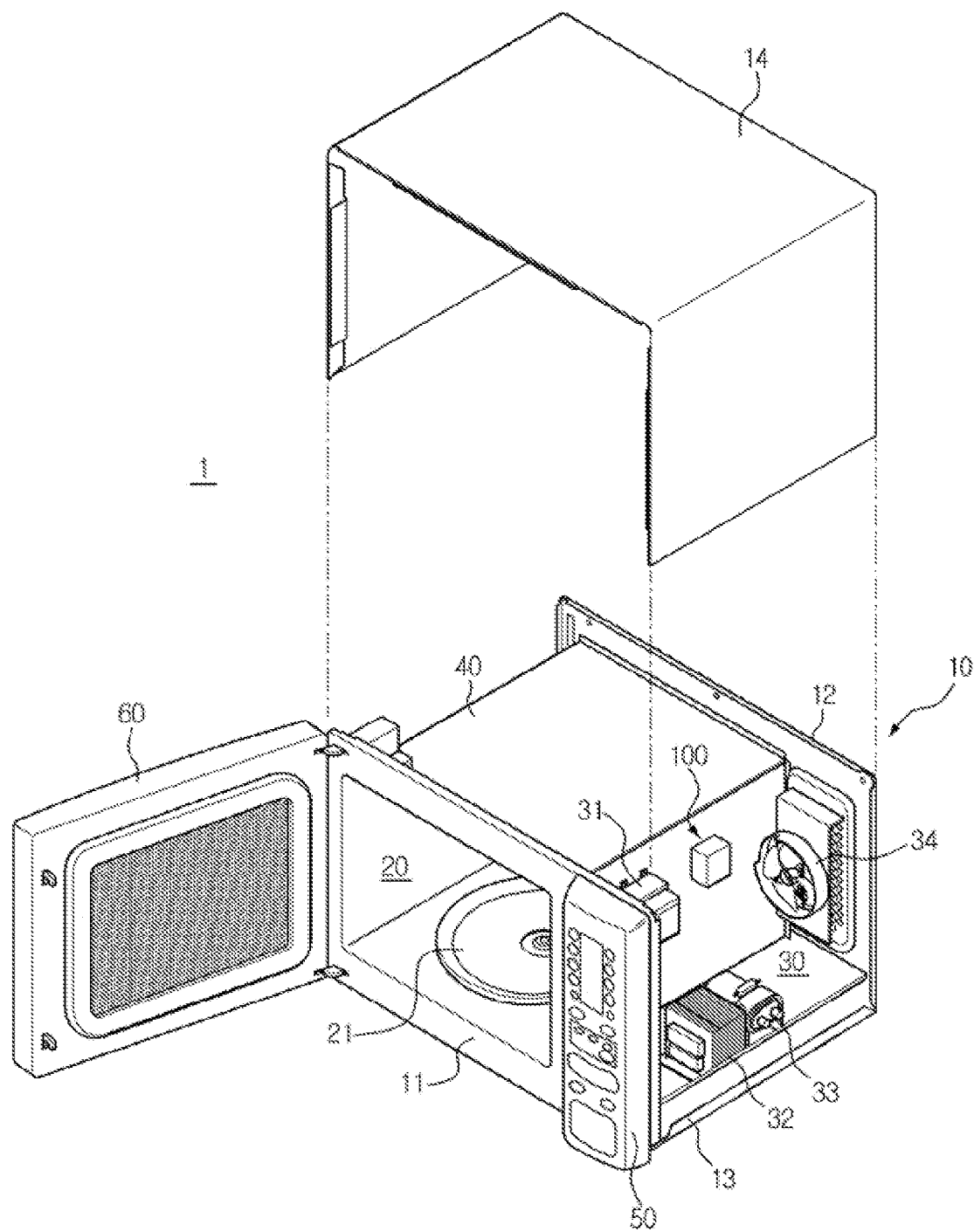
FIG. 2 is an exploded perspective view illustrating a main structure of the microwave oven applied with the infrared ray detecting apparatus in accordance with the embodiment of the present disclosure.

FIG. 1 is a perspective view showing an exterior appearance of a microwave oven applied with an infrared ray detecting apparatus in accordance with an embodiment of the present disclosure, and FIG. 2 is an exploded perspective view illustrating a main structure of the microwave oven applied with the infrared ray detecting apparatus in accordance with an embodiment of the present disclosure.

As illustrated on FIG. 1 and FIG. 2, a microwave oven 1 includes a body 10 forming an exterior appearance. The body 10 includes a front surface panel 11 and a rear surface panel 12 forming a front surface and a rear surface, respectively, a bottom panel 13 forming a bottom surface, and a cover 14 forming both side surfaces and an upper surface.

An inner case 40 having a hexagonal shape is formed inside the body 10 while provided with an open front surface thereof, so that an interior space of the inner case 40 may form a cooking compartment 20 and an exterior space of the body 10 forms an electronic component compartment 30. At the front surface panel 11, a door 60 hinged to the front surface panel 11 to open and close the cooking compartment 20, as well as a manipulation panel 50 provided with a plurality of manipulation buttons 51 installed thereto to manipulate the overall operation of the microwave oven 1 is provided.

At the electronic component compartment 30 at a right side of the cooking compartment 20, a magnetron 31 provided to generate a radio frequency wave that is supplied inside the cooking compartment 20, a high voltage transformer 32 and a high voltage condenser 33 configured to apply a high voltage to the magnetron 31, and a cooling fan 34 configured to cool each compartment inside the electronic component compartment 30 are installed, and inside the cooking compartment 20, a tray 21 may be installed at a bottom of the cooking compartment 20 so that the food to be cooked may be placed on the tray 21, as well as a waveguide (not shown) to guide the radio frequency wave being radiated from the magnetron 31 to the inside of the cooking compartment 20 is installed.

Using the structure as described, when food is placed on the tray 21, by operating the microwave oven 1, a radio frequency wave is radiated to the inside of the cooking compartment 20. By the radio frequency wave radiated to the inside of the cooking compartment 20, the molecule arrangements of the moisture contained in the food are repeatedly changed. Accordingly, the friction heat generated between the molecules as a result of the repeatedly changed molecule arrangements of the moisture contained in the food cooks the food placed in the cooking compartment 20.

At this time, by detecting the temperature of the food, the cooking status of the food may be determined. The temperature of the food may be calculated by detecting the intensity of the infrared ray generated from the food. Thus, the microwave oven 1 includes an infrared ray detecting apparatus 100 configured to detect the intensity of the infrared ray generated by the food inside the cooking compartment 20.

Figure 3:
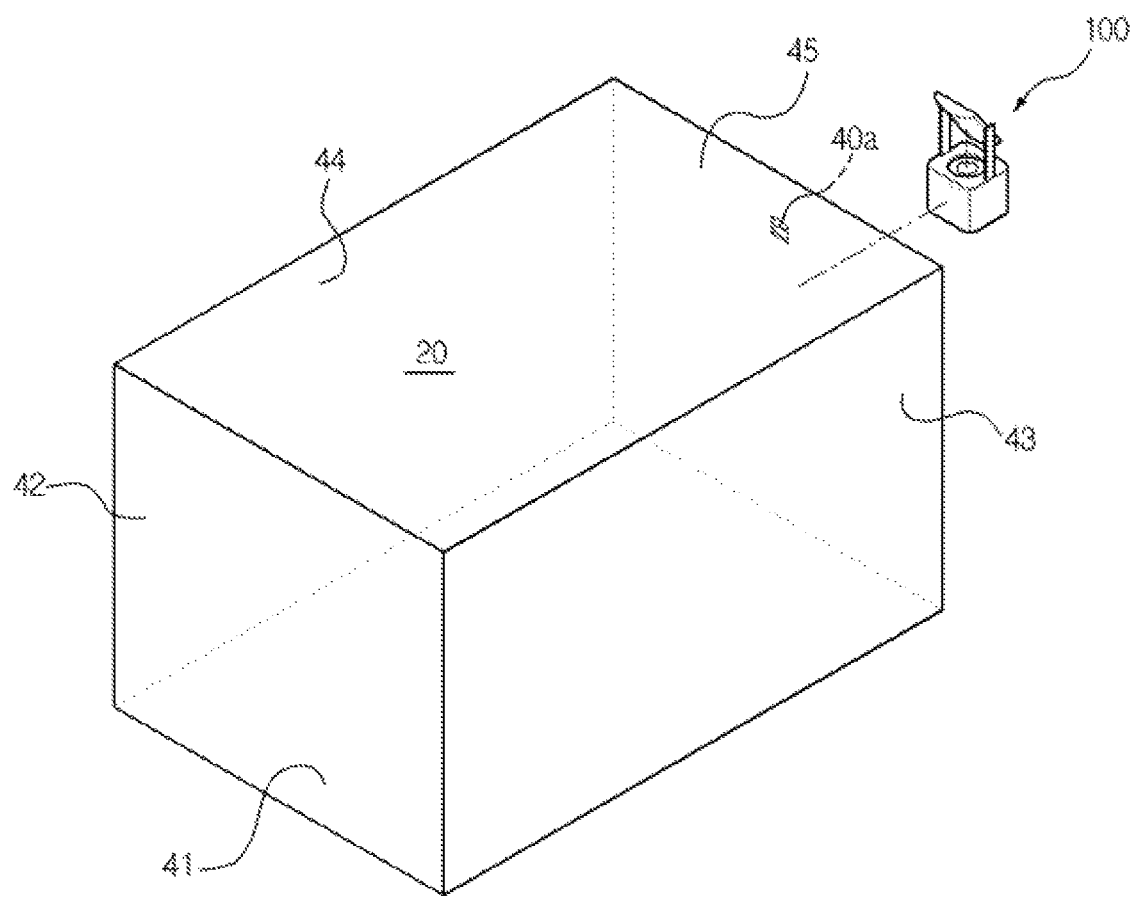
FIG. 3 is a drawing illustrating the infrared ray detecting apparatus oven in accordance with the embodiment of the present disclosure, the infrared ray detecting apparatus mounted at the outside of a cooking compartment of the microwave.

FIG. 3 is a drawing illustrating the infrared ray detecting apparatus oven in accordance with the embodiment of the present disclosure, the infrared ray detecting apparatus mounted outside a cooking compartment of the microwave.

As illustrated on FIG. 3, the infrared ray detecting apparatus 100 in accordance with an embodiment of the present disclosure is disposed outside the inner case 40. At the inner case 40, a detection hole 40a is formed, through which the infrared ray generated in the cooking compartment 20 is released to the outside of the cooking compartment 20. The infrared ray detecting apparatus 100 is disposed around the detection hole 40a to receive the infrared ray passing through the detection hole 40a. The infrared ray detecting apparatus 100 may be fixed to the inner case 40 by a coupling member, such as a screw, for example.

The detection hole 40a is formed at the right side wall 43 of the inner case 40. However, the position of the detection hole 40a is not limited hereto. For example, the detection hole 40a may be formed at the left side wall 42, the rear side wall 44, or the upper side wall 45 of the inner case 40. Because the infrared ray detecting apparatus 100 is disposed around the detection hole 40a, the position of the detection hole 40a is limited, depending on where the infrared ray detecting apparatus 100 is disposed.

When the detection hole 40a is formed through one of the left side wall 42, the right side wall 43, or the rear side wall 44 of the inner case 40, the detection hole 40a is positioned to be nearer to the upper side wall 45 of the inner case 40 than to the lower side wall 41 of the inner case 40. Food is placed at a lower portion space of the cooking compartment 20, and thus the detection hole 40a is formed in a way to be communicated with an upper side space of the cooking compartment 20, so that the infrared ray generated at an entire domain of the lower portion space of the cooking compartment 20 is passed through the detection hole 40a and is received at the infrared ray detecting apparatus 100.

The detection hole 40a may be formed in a rectangular shape, but may also be formed in a circular shape or an oval shape. However, the shape of the detection hole is not limited to the above shapes, and may be formed to be any shape appropriate to allow the infrared ray to be passed to the infrared ray detecting apparatus 100.

Figure 4:
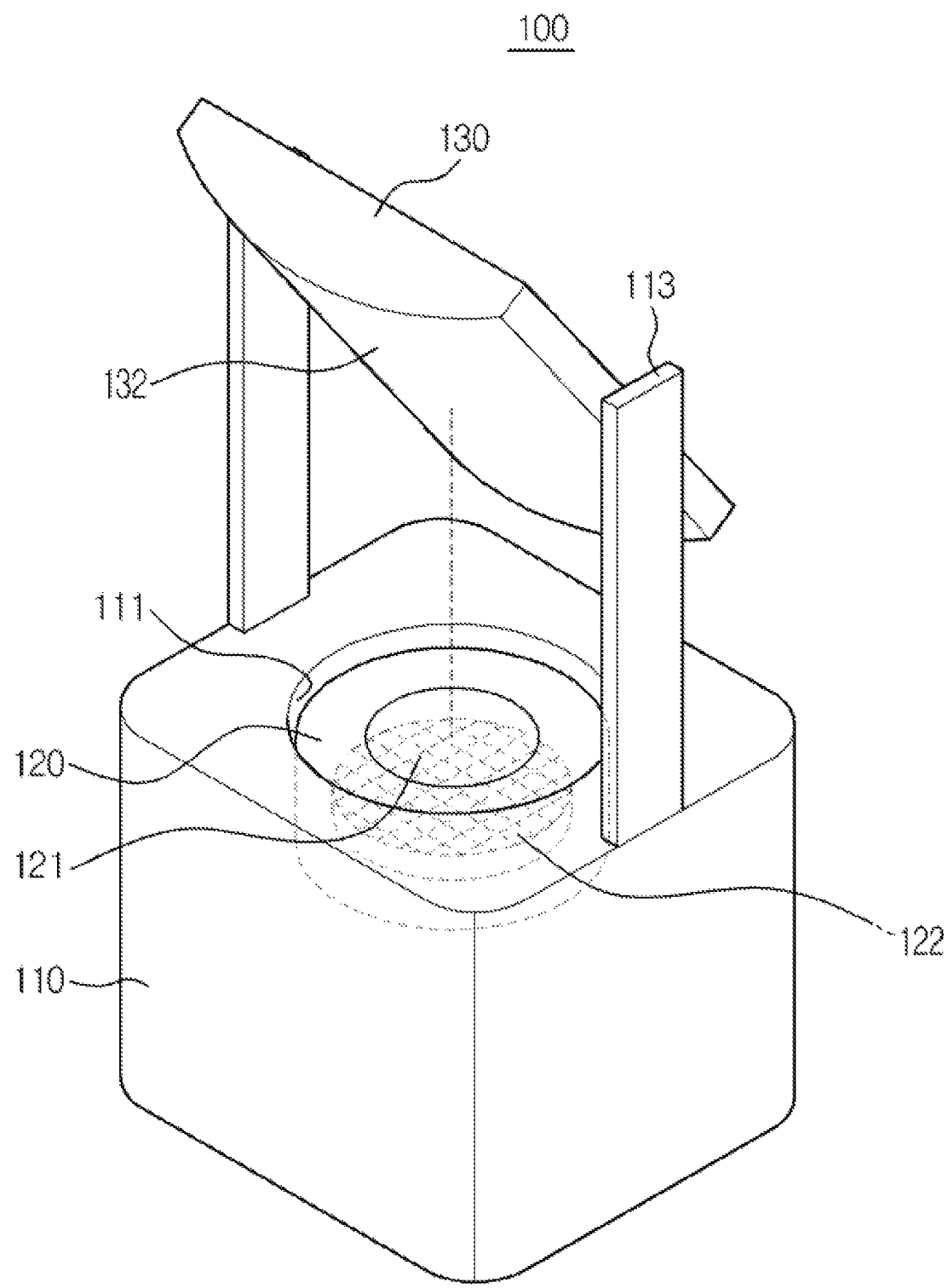
FIG. 4 is a perspective illustrating the infrared ray detecting apparatus in accordance with the embodiment of the present disclosure.

FIG. 4 is a perspective illustrating the infrared ray detecting apparatus in accordance with the embodiment of the present disclosure.

As illustrated on FIG. 4, the infrared ray detecting apparatus 100 in accordance with the embodiment of the present disclosure includes a housing 110, an infrared ray sensor 120, and a reflecting mirror 130.

The housing 110 forms an exterior appearance of the infrared ray detecting apparatus 100. At the housing 110, a sensor mounting unit 111 at which the infrared ray sensor 120 is mounted is formed. The sensor mounting unit 111 is formed in a way that an upper side thereof is open, while the shape thereof corresponds to the infrared ray sensor 120.

At an upper surface of the housing 110, a supporting unit 113 supporting the reflecting mirror 130 is formed while being extended in an upper direction thereof. The supporting unit 113 is provided in two units thereof to support both sides of the reflecting mirror 130. Here, the reflecting mirror 130 is fixedly mounted at the supporting units 113.

The infrared ray sensor 120 is provided with a cylindrical shape, and a light receiving unit 121 to receive an infrared ray is provided at an upper side surface of the infrared ray sensor 120. However, the infrared ray sensor is not limited to the cylindrical shape described above, and may be formed to be any appropriate shape. The infrared ray sensor 120 is mounted at the sensor mounting unit 111 in a way that that light receiving unit 121 is positioned while facing toward an upper side direction. At a lower side of the light receiving unit 121, a plurality of infrared ray detecting devices 122 is disposed, and the infrared ray detecting devices 122, by receiving an infrared ray, generate a detection output that corresponds to the intensity of the infrared ray.

The plurality of infrared ray detecting devices 122 may be able to receive the infrared rays generated at infrared ray detection domains, (each referred to as an "unit detection domain"), that are provided in the number corresponding to the number of the plurality of infrared ray detecting devices 122. For example, assuming that the entire domain of the bottom surface of the cooking compartment 20 is composed of the 'N' (N≥2) number of the unit detection domains, an individual infrared ray detecting device (not shown) among the 'N' number of infrared detecting devices 122 receives the infrared ray generated from one of the 'N' number of the unit detection domains. That is, the unit detection domain is referred to as a domain that generates an infrared ray signal that is received by one infrared ray detecting device 122 among the plurality of infrared ray detecting devices 122 disposed at a lower side of the light receiving unit 121.

The reflecting mirror 130 is positioned on the path of the infrared ray that passes through the detection hole 40a of the inner case 40. The reflecting mirror 130, by reflecting the infrared ray being delivered (incident) from the cooking compartment 20, changes the path of the infrared ray.

The reflecting mirror 130 may be a plane surface mirror provided with an incidence angle and a reflection angle that are same, or a curved surface mirror (a convex mirror or a concave mirror) provided with a constant curvature. With respect to the curved surface mirror, a curved surface mirror having a spherical shape, a curved surface mirror having a non-spherical shape, and a curved surface mirror having a cylindrical shape are included. In the embodiment of the present disclosure, the curved surface mirror having a cylindrical shape being used is illustrated.

In a case when the reflecting mirror 130 is a reflecting mirror having a curvature instead of a plane surface mirror, by converging the infrared ray being incident at the reflecting mirror and then reflecting the converged infrared ray toward the infrared ray sensor 120, a wider area of the cooking compartment 20 may be able to be detected when compared to the case of the plane surface mirror.

Thus, even when the reflecting mirror 130 is not being rotated, the infrared ray generated at the entire domain of the bottom surface of the cooking compartment 20 may be received by the infrared ray sensor 120.

The reflecting mirror 130 is disposed in a way that a virtual axis of the light receiving unit 121, which is perpendicular to the light receiving unit 121 of the infrared ray sensor 120 and extended from the center of the light receiving unit 121 toward an upper direction thereof, is passed through the surrounding of the focus of the reflecting mirror 130. The infrared ray passed through the detection hole 40a is reflected by a reflection surface 132 of the reflecting mirror 130, and is converged at the light receiving unit 121. At this time, the reflecting mirror 130 is disposed while being spaced apart in a predetermined distance from the infrared ray sensor 120.

Figure 5:
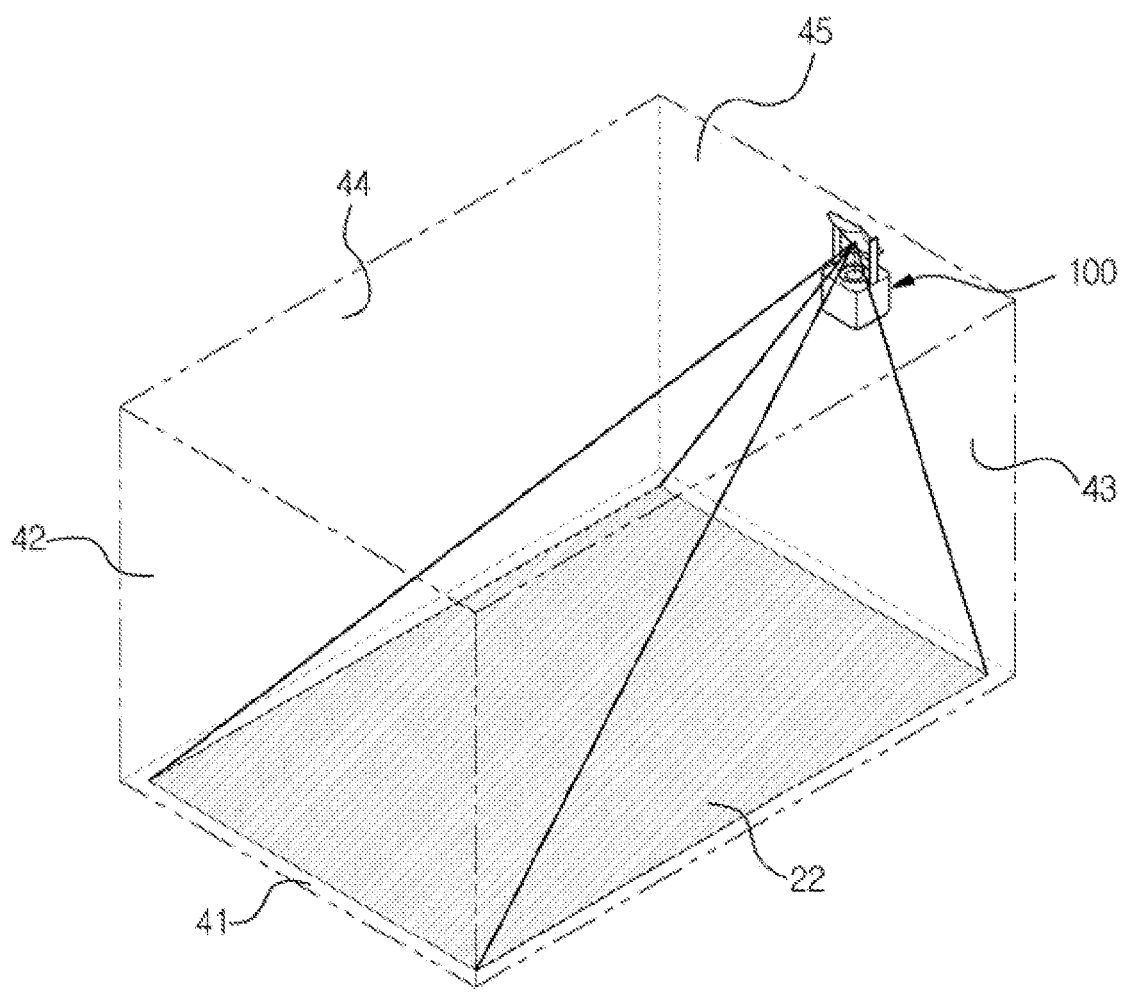
FIG. 5 is a drawing illustrating a detection domain of the infrared ray detecting apparatus in accordance with the embodiment of the present disclosure.

FIG. 5 is a drawing illustrating a detection domain of the infrared ray detecting apparatus in accordance with the embodiment of the present disclosure.

As illustrated on FIG. 5, looking at the cooking compartment 20 from the infrared ray detecting apparatus 100, the entirety of the bottom surface of the cooking compartment 20 becomes a detection domain 22, an infrared ray of which is detected by the infrared ray detecting apparatus 100.

The infrared ray generated from the detection domain 22 is received by the plurality of infrared ray detecting devices (not shown) accommodated inside the infrared ray sensor 120.

When the infrared ray generated from the detection domain 22 is received by the infrared ray sensor 120, the intensity of the infrared ray is detected. By using the intensity of the detected infrared ray, the temperature of the detection domain 22 may be calculated. Based on the above, the temperature distribution of the entire bottom surface of the cooking compartment 20 may be able to be calculated.

As described above, the infrared ray detecting apparatus 100 in accordance with an embodiment of the present disclosure includes the reflecting mirror 130 having one reflection surface 132. Meanwhile, the infrared ray detecting apparatus (200 on FIG. 6) in accordance with an embodiment of the present disclosure to be described hereinafter includes a reflecting mirror (230 of FIGS. 6 to 7) having a plurality of reflection surfaces (232 and 234 on FIG. 7), and thus is different when compared to the infrared ray detecting apparatus 100 described above. Hereinafter, by using a case of the reflecting mirror 230 having two units of reflection surfaces 232 and 234, the mounted state, the structure, and the detection range of the infrared ray detecting apparatus 200 in accordance with an embodiment of the present disclosure will be described in detail.

Figure 6:
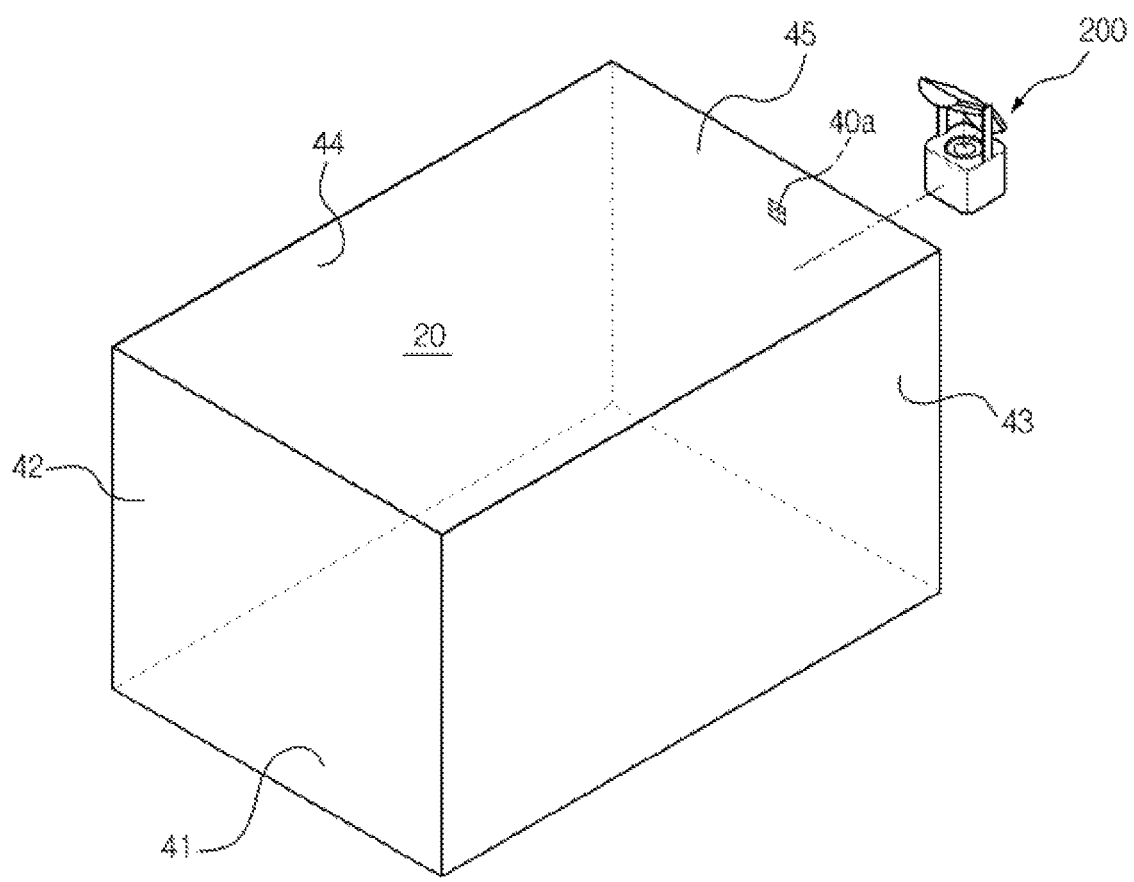
FIG. 6 is a drawing illustrating an infrared ray detecting apparatus in accordance with an embodiment of the present disclosure mounted outside the cooking compartment of the microwave oven.

FIG. 6 is a drawing illustrating an infrared ray detecting apparatus in accordance with an embodiment of the present disclosure mounted at the outside of the cooking compartment of the microwave oven.

As illustrated on FIG. 6, the infrared ray detecting apparatus 200 in accordance with an embodiment of the present disclosure is disposed at the outside of the inner case 40. At the right side wall 43 of the inner case 40, the detection hole 40a through which the infrared ray generated at the cooking compartment 20 is released to the outside of the cooking compartment 20 is formed.

In the embodiment of the present disclosure, the detection hole 40a is formed at the right side wall 43 of the inner case 40, but may be formed at the left side wall 42, the rear side wall 44, or the upper side wall 45 of the inner case 40.

In a case when the detection hole 40a is formed at the left side wall 42 of the inner case 40, at the right side wall 43 of the inner case 40, or at the rear side wall 44 of the inner case 40, the detection hole 40a is positioned to be nearer to the upper side wall 45 of the inner case 40 than to the lower side wall 41 of the inner case 40, as described earlier.

The infrared ray detecting apparatus 200 is disposed around the detection hole 40a to receive the infrared ray passing through the detection hole 40a.

The infrared ray detecting apparatus 200 is mounted near the right side wall 43, so that the infrared ray generated at the entire domain of a lower portion space of the cooking compartment 20 is easily received by the infrared ray detecting apparatus 200 after passing through the detection hole 40a. That is, the infrared ray detecting apparatus 200 is disposed in a way that the infrared ray generated at the entire domain of the lower portion space of the cooking compartment 20 may be incident at a first reflection surface (232 on FIG. 7) or at a second reflection surface (234 on FIG. 7) of the infrared ray detecting apparatus 200 after passing through the detection hole 40a.

Figure 7:
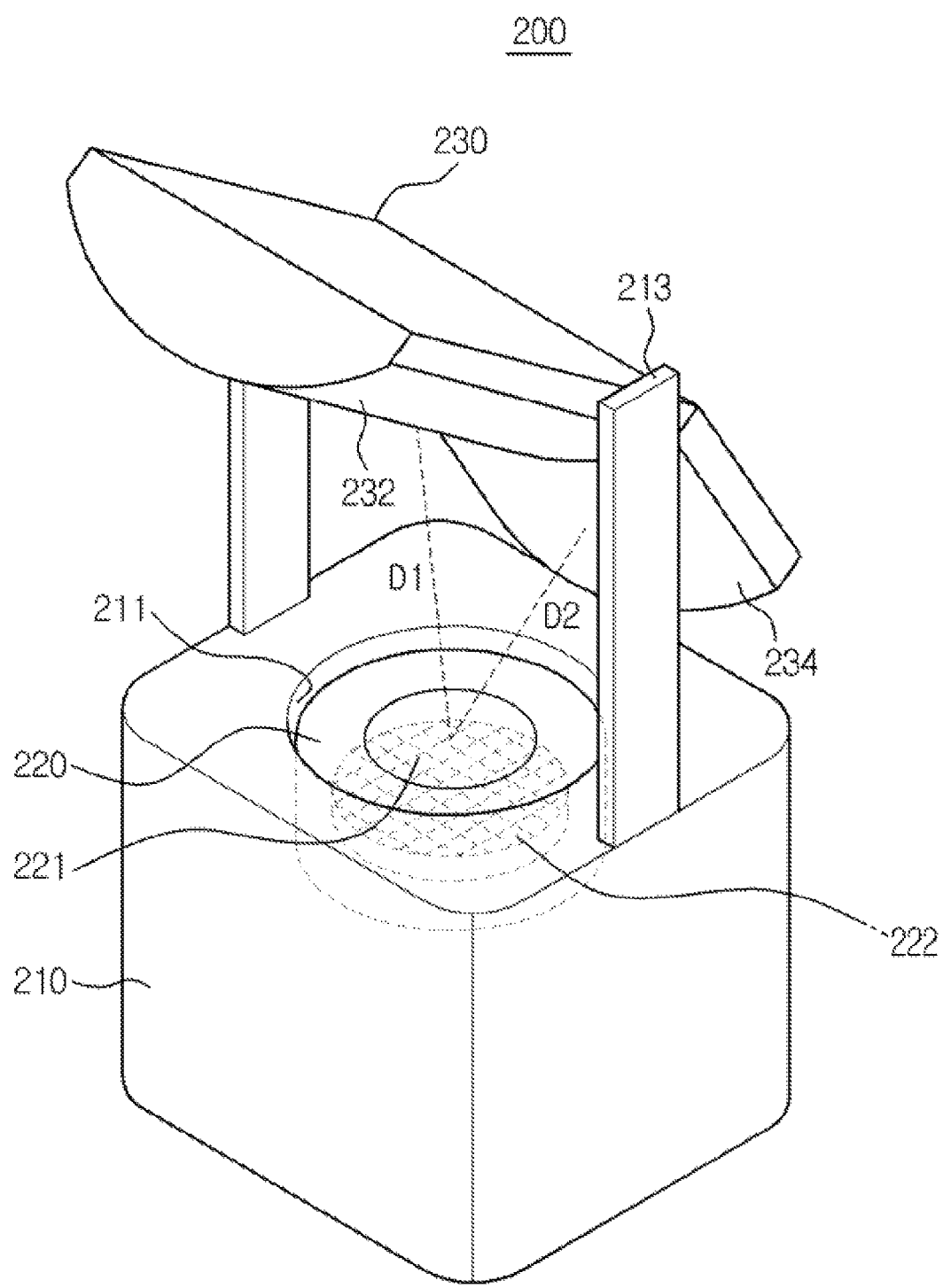
FIG. 7 is a perspective illustrating the infrared ray detecting apparatus of FIG. 6.
Figure 8A:
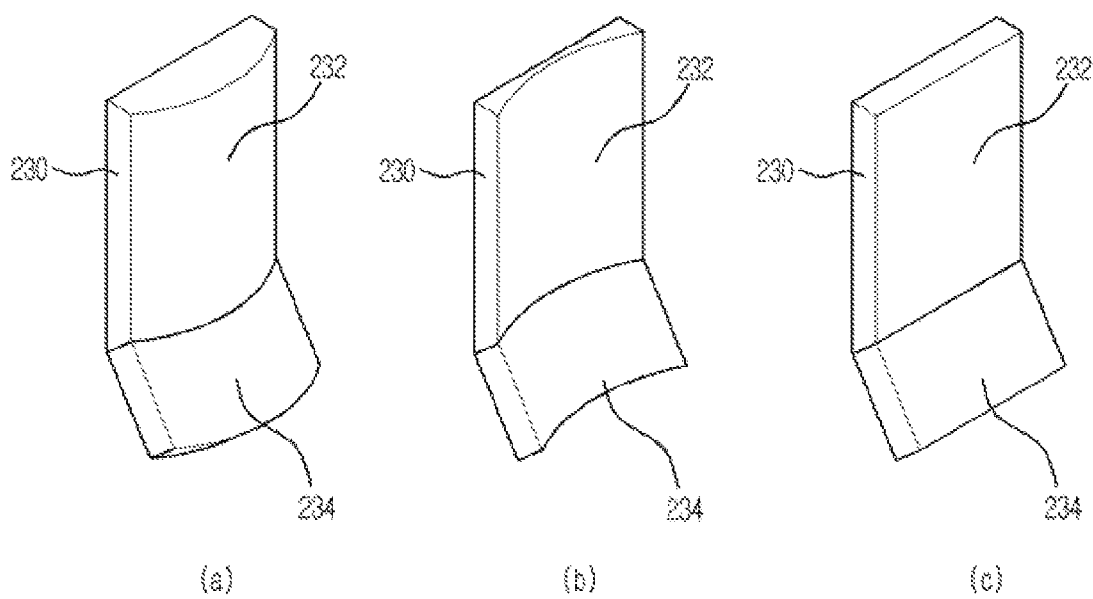
FIG. 8A part (a), part (b), and part (c) illustrate a variety of reflecting mirrors depending on the shape of a reflection surface.
Figure 8B:
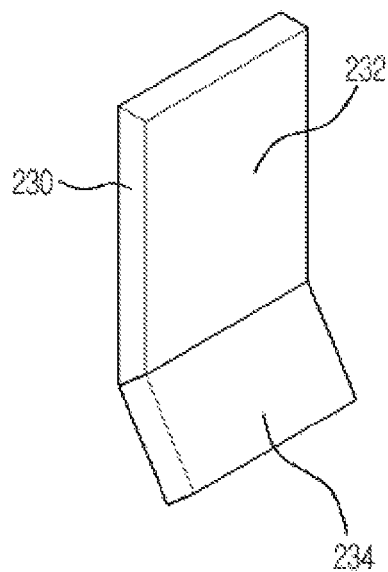
FIG. 8B part (a) and part (b) illustrate a variety of reflecting mirrors depending on the number of reflection surfaces.
Figure 8B:
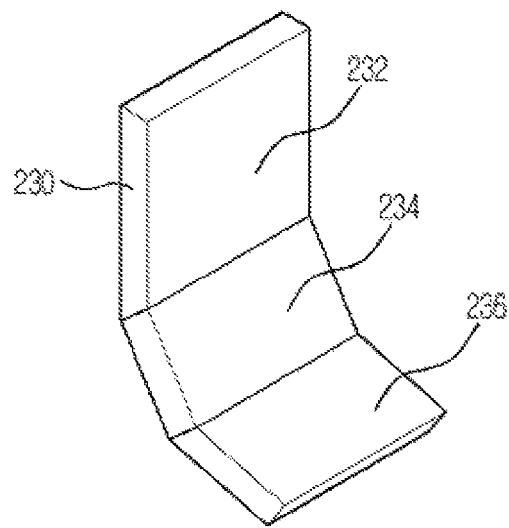

FIG. 7 is a perspective illustrating the infrared ray detecting apparatus of FIG. 6. FIG. 8A is a drawing illustrating a variety of reflecting mirrors depending on the shape of a reflection surface. FIG. 8B is a drawing illustrating a variety of reflecting mirrors depending on the number of reflection surfaces.

As illustrated on FIG. 7, the infrared ray detecting apparatus 200 in accordance with an embodiment of the present disclosure includes a housing 210, an infrared ray sensor 220, and a reflecting mirror 230.

The housing 210 forms an exterior appearance of the infrared ray detecting apparatus 200. At the housing 210, a sensor mounting unit 211 at which the infrared ray sensor 220 is mounted is formed. The sensor mounting unit 211 is formed in a way that an upper side thereof is open, while the shape thereof corresponds to the infrared ray sensor 220.

At an upper surface of the housing 210, a supporting unit 213 supporting the reflecting mirror 230 is formed while being extended in an upper direction thereof. The supporting unit 213 is provided in two units thereof to support the both sides of the reflecting mirror 230. Here, the reflecting mirror 230 is fixedly mounted at the supporting units 213.

The infrared ray sensor 220 is provided with a cylindrical shape, and a light receiving unit 221 to receive an infrared ray is provided at an upper side surface of the infrared ray sensor 220. The infrared ray sensor 220 is mounted at the sensor mounting unit 211 in a way that that light receiving unit 121 is positioned while facing toward an upper side direction. At a lower side of the light receiving unit 221, a plurality of infrared ray detecting devices 222 is disposed, and the infrared ray detecting devices 222, by receiving an infrared ray, generate a detection output that corresponds to the intensity of the infrared ray.

The plurality of infrared ray detecting devices 222 may be able to receive the infrared rays generated at infrared ray detection domains (each referred to as an "unit detection domain"), that are provided in the number corresponding to the number of the plurality of infrared ray detecting devices 222. For example, assuming that the entire domain of the bottom surface of the cooking compartment 20 is composed of the 'N' (N≥2) number of the unit detection domains, an individual infrared ray detecting device (not shown) among the 'N' number of infrared detecting devices 222 receives the infrared ray generated from one of the 'N' number of the unit detection domains. That is, the unit detection domain is referred to as a domain that generates an infrared ray signal that is received by one infrared ray detecting device 222 among the plurality of infrared ray detecting devices 222 disposed at a lower side of the light receiving unit 221.

The reflecting mirror 230 is positioned on the path of the infrared ray that passes the detection hole 40a of the inner case 40. The reflecting mirror 230, by reflecting the infrared ray being delivered from the cooking compartment 20, changes the path of the infrared ray.

The reflecting mirror 230 is provided with two units of reflection surfaces, that is, the first reflection surface 232 and the second reflection surface 234. Here, the first reflection surface 232 and the second reflection surface 234 are provided with the inclinations that are different from each other. That is, by combining the two units of the reflection surfaces 232 and 234 having the reflection inclinations that are different from each other, the one reflecting mirror 230 is formed. At this time, each of the reflecting mirrors 232 and 234 receives the infrared ray being delivered from a different infrared ray detection domain, and delivers the received infrared ray to the light receiving unit 221. That is, the infrared ray generated at one portion of the entire domain of the lower portion space of the cooking compartment 20 is reflected by the first reflection surface 232 after passing through the detection hole 40a, and is received by the infrared ray sensor 220, while the infrared ray generated from a remaining portion (except for the one portion) of the entire domain of the lower portion space of the cooking compartment 20 is reflected by the second reflection surface 234 after passing through the detection hole 40a, and is received by the infrared ray sensor 220.

The reflecting mirror 230 having a plurality of reflection surfaces may be manufactured in various forms (a variety of the reflecting mirrors depending on the shape of the reflection surface) by combining a plane surface mirror provided with an incidence angle and a reflection angle that are same and a curved surface mirror (a concave mirror or a convex mirror) having a constant curvature. For example, as illustrated on FIG. 8A part (a), by combining two of the convex mirrors, one reflecting mirror 230 having a plurality of reflection surfaces may be formed. In the case as such, each of the first reflection surface 232 and the second reflection surface 234 is provided as a convex reflection surface having a constant curvature. In addition, as illustrated on FIG. 8B part (b), by combining two of the concave mirrors, one reflecting mirror 230 having a plurality of reflection surfaces may be formed. In the case as such, each of the first reflection surface 232 and the second reflection surface 234 is provided as a concave reflection surface having a constant curvature. In addition, as illustrated on FIG. 8B part (c), by combining two of the plane surface mirrors, one reflecting mirror 230 having a plurality of reflection surfaces may be formed. In the case as such, each of the first reflection surface 232 and the second reflection surface 234 is provided as the plane reflection surface. Meanwhile, although not illustrated on the drawing, depending on the need, by combining one plane surface mirror with one curved surface mirror (the convex mirror or the concave mirror), one reflecting mirror 230 having a plurality of reflection surfaces may be manufactured.

In addition, with respect to the reflecting mirror 230 having a plurality of reflection surfaces, depending on the number of the combined reflection surfaces, the reflecting mirror 230 may be manufactured in various forms (a variety of the reflecting mirrors depending on the number of the reflection surfaces). For example, as illustrated on FIG. 8B part (a), the reflecting mirror 230 having two reflection surfaces, that is, the first reflection surface 232 and the second reflection surface 234, may be formed, and as illustrated on FIG. 8B part (b), the reflecting mirror 230 having three reflection surface, that is, the first reflection surface 232, the second reflection surface 234, and a third reflection surface 236, may be formed.

In the embodiment of the present disclosure, the reflecting mirror 230 having two convex reflection surfaces, which are formed by combining two convex mirrors, being used is illustrated as an example. Here, the distance D1 between the first reflection surface 232 and the infrared ray sensor 220 is farther than the distance D2 between the second reflection surface 234 and the infrared ray sensor 220 (D1≥D2). The infrared ray passed through the detection hole 40a is reflected by the first reflection surface 232 or at the second reflection surface 234, and is converged at the light receiving unit 221. At this time, the reflecting mirror 230 is disposed while being spaced apart in a predetermined distance from the infrared ray sensor 220.

Figure 9:
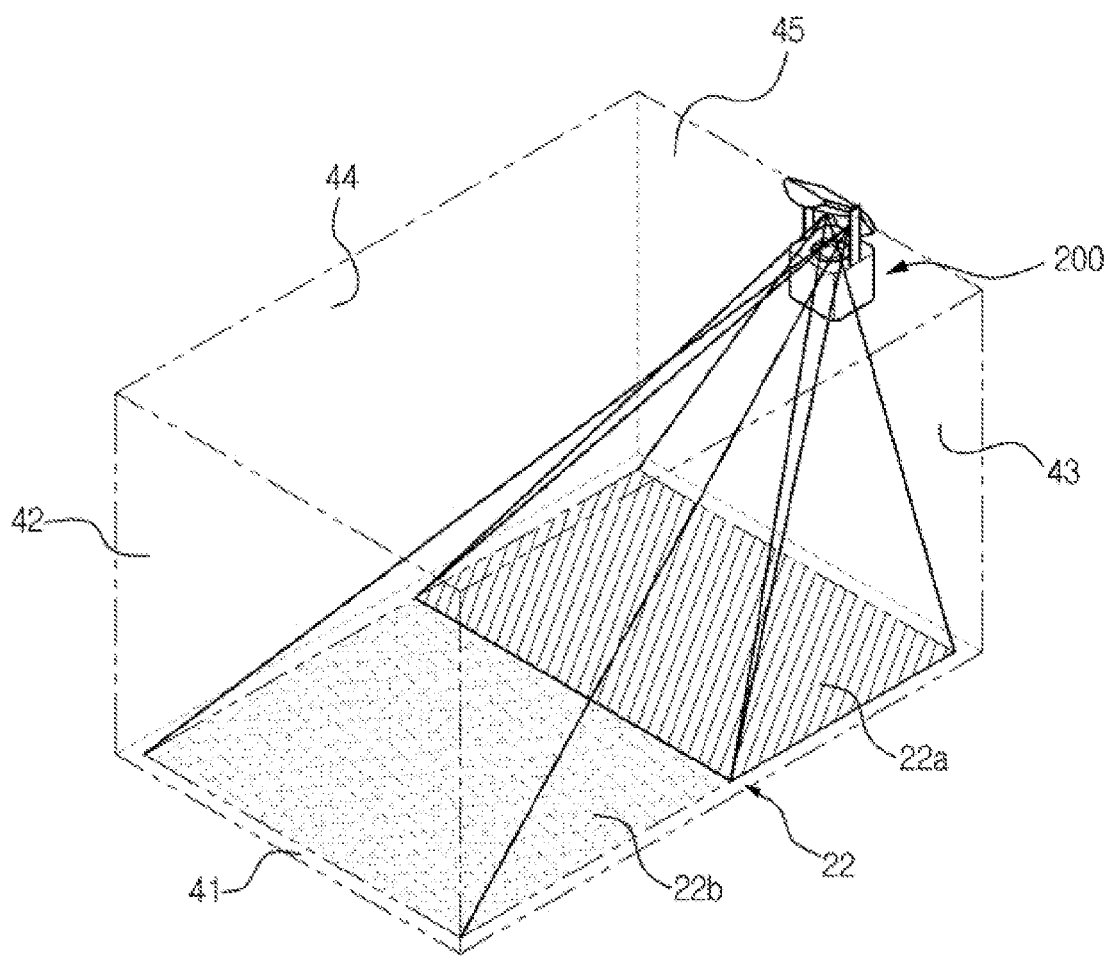
FIG. 9 is a drawing illustrating a detection domain of the infrared ray detecting apparatus of FIG. 6.

FIG. 9 is a drawing illustrating a detection domain of the infrared ray detecting apparatus of FIG. 6.

As illustrated on FIG. 9, looking at the cooking compartment 20 from the infrared ray detecting apparatus 200, the entirety of the bottom surface of the cooking compartment 20 becomes a detection domain 22, an infrared ray of which is detected by the infrared ray detecting apparatus 200.

To describe the above in more detail, two of the reflection surfaces 232 and 234 formed at the reflecting mirror 230, by changing the path of the infrared ray signal being delivered from two different infrared ray detection domains 22a and 22b, enables the infrared ray signals to be received by the infrared ray sensor 220. That is, the infrared ray signal generated from the first detection domain 22a, which is close to the infrared ray detecting apparatus 200 in distance, is reflected by the first reflection surface 232, which is disposed far from the infrared ray sensor 220, and then is received by the plurality of infrared ray detecting devices (not shown) accommodated at the inside of the infrared ray sensor 220. Meanwhile, the infrared ray signal generated at the second detection domain 22b, which is far from the infrared ray detecting apparatus 200 in distance, is reflected by the second reflection surface 234, which is disposed close to the infrared ray sensor 220, and then is received by the plurality of infrared ray detecting devices (not shown) accommodated at the inside of the infrared ray sensor 220. That is, each of the reflection surfaces 232 and 234 reflects a corresponding one of the infrared rays delivered from the infrared ray detection domains 22a and 22b that are different from each other, so that the infrared ray may be delivered to the light receiving unit 221.

When the infrared rays generated from the first detection domain 22a and at the second detection domain 22b are received by the infrared ray sensor 220, the intensity of the infrared ray is detected. By using the intensity of the detected infrared ray, the temperature of the entire detection domain 22 may be calculated. Based on the above, the temperature distribution of the entire bottom surface of the cooking compartment 20 may be calculated.

Figure 10A:
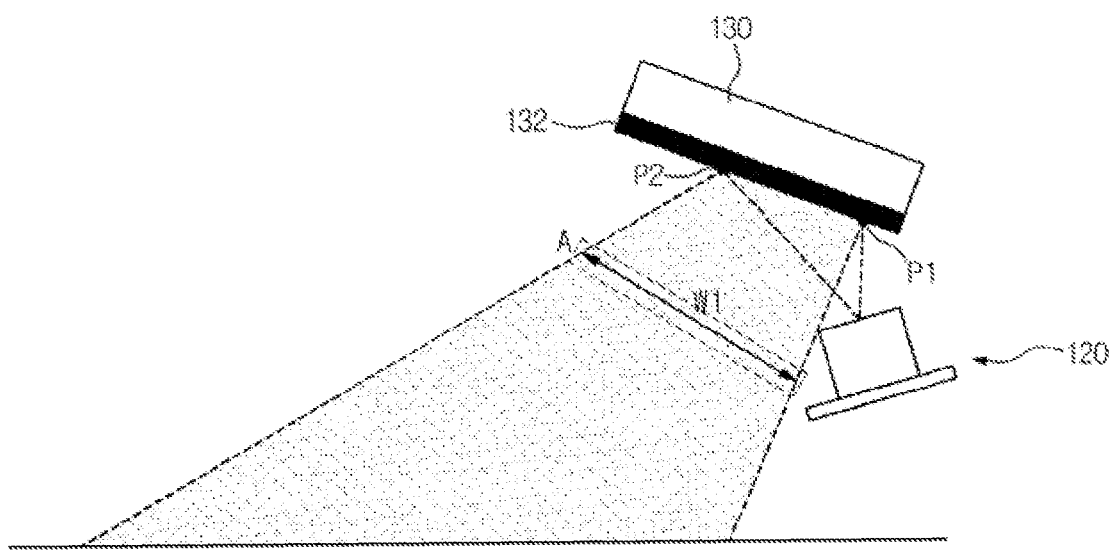
FIG. 10A is a drawing provided to describe the incidence process of an infrared ray signal and the size of a detection hole in a case when detecting an infrared ray by using the infrared ray detecting apparatus of FIG. 3.
Figure 10B:
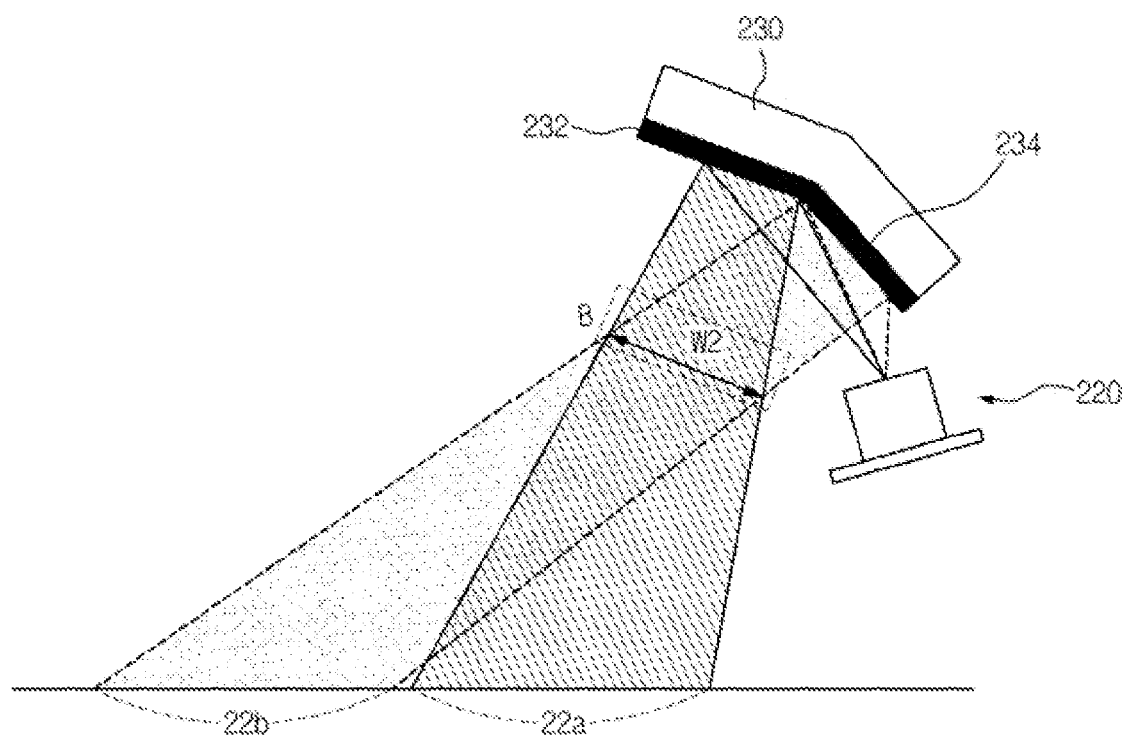
FIG. 10B is a drawing provided to describe the incident process of an infrared ray signal and the size of a detection hole in a case when detecting an infrared ray by using the infrared ray detecting apparatus of FIG. 6.

FIG. 10A is a drawing provided to describe the incidence process of an infrared ray signal and the size of a detection hole in a case when detecting an infrared ray by using the infrared ray detecting apparatus 100 of FIG. 3, and FIG. 10B is a drawing provided to describe the incidence process of an infrared ray signal and the size of a detection hole in a case when detecting an infrared ray by using the infrared ray detecting apparatus of FIG. 6.

As illustrated on FIG. 10A, with respect to a case of detecting the infrared ray generated from the cooking compartment 20 by using the infrared ray detecting apparatus 100 in accordance with an embodiment of the present disclosure, that is, the infrared ray detecting apparatus 100 having applied with the reflecting mirror 130 provided with one reflection surface 132, the infrared ray signal generated from the detection domain 22 having a close distance to the infrared ray detecting apparatus 100 is reflected by a point (for example, P1) of the reflection surface 132 that is close to the infrared ray sensor 120, and then is received by the plurality of infrared ray detecting devices (not shown) accommodated at the inside of the infrared ray sensor 120. Meanwhile, the infrared ray signal generated from the detection domain 22 having a far distance from the infrared ray detecting apparatus 100 is reflected by a point (for example: P2) of the reflection surface 132 that is far from the infrared ray sensor 120, and then is received by the plurality of infrared ray detecting devices (not shown) accommodated at the inside of the infrared ray sensor 120. That is, the infrared rays generated from the entire domain of the lower portion space of the cooking compartment 20 are reflected by the one reflection surface 132, and then are received by the infrared ray sensor 120. The width of an infrared ray signal being incident to the reflection surface 132 from the entire domain of a lower portion space of the cooking compartment 20 with respect to a domain (domain 'A') having the detection hole 40a configured to pass the infrared ray that is generated inside the cooking compartment 20 to the outside of the cooking compartment 20, is referred to as W1. Here, depending on the width W1 of the infrared ray signal being incident to the reflection surface 132, the size of the detection hole 40a is determined. That is, if the width W1 of the infrared ray signal being incident to the reflection surface 132 is wide, the size (the area) of the detection hole 40a becomes large, and if the width W1 of the infrared ray signal being incident to the reflection surface 132 is narrow, the size (the area) of the detection hole 40a becomes small.

Meanwhile, as illustrated on FIG. 10B, in a case of detecting the infrared ray generated from the cooking compartment 20 by using the infrared ray detecting apparatus 200 in accordance with an embodiment of the present disclosure, that is, the infrared ray detecting apparatus 200 having applied with the reflecting mirror 230 provided with a plurality of reflection surfaces, for example, two reflection surfaces 232 and 234, the infrared ray signal generated from the first detection domain 22a having a close distance to the infrared ray detecting apparatus 200 is reflected by the first reflection surface 232 that is far from the infrared ray sensor 220, and then is received by the plurality of infrared ray detecting devices (not shown) accommodated at the inside of the infrared ray sensor 220. Meanwhile, the infrared ray signal generated from the detection domain 22b having a far distance from the infrared ray detecting apparatus 100 is reflected by the second reflection surface 234 that is close to the infrared ray sensor 220, and then is received by the plurality of infrared ray detecting devices (not shown) accommodated at the inside of the infrared ray sensor 220. That is, the infrared rays generated at the entire domain of the lower portion space of the cooking compartment 20 are reflected by the two reflection surfaces 232 and 234, and are received by the infrared ray sensor 220.

The width of the infrared ray signal being incident to the two reflection surfaces 232 and 234 from the entire domain of the lower portion space of the cooking compartment 20 with respect to a domain (domain 'B') having the detection hole 40a configured to pass the infrared ray that is generated inside the cooking compartment 20 to the outside of the cooking compartment 20 is referred to as W2. As illustrated on FIG. 10B, in a case of detecting the infrared ray generated from the cooking compartment 20 by using the infrared ray detecting apparatus 200 having applied with the reflecting mirror 230 provided with the two reflection surfaces 232 and 234, a domain 'B' is present. The domain 'B' is referred to as a domain at which an infrared ray signal being generated from the first detection domain 22a and then incident to the first reflection surface 232 intersects an infrared ray signal being generated from the second detection domain 22b and then incident to the second reflection surface 234.

Thus, in a case of using the reflecting mirror 230 having the two reflection surfaces 232 and 234, the width W2 of the infrared ray signal being incident to the two reflection surfaces 232 and 234 from the entire domain of the lower portion space of the cooking compartment 20 with respect to the domain B having the detection hole 40a becomes relatively narrower when compared to the width W1 of the infrared ray signal being incident to the reflection surface 132 from the entire domain of the lower portion space of the cooking compartment 20 with respect to the domain A having the detection hole 40a in a case of using the reflecting mirror 140 having one reflection surface 132 (W2<W1). As described above, depending on the width (W1 and W2) of the infrared ray signals being incident to the reflection surfaces 132, 232, and 234, the size of the detection hole 40a is determined. Thus, in a case of using the infrared ray detecting apparatus 200 in accordance with an embodiment of the present disclosure, that is, the infrared ray detecting apparatus 200 having applied with the reflecting mirror 230 provided with the plurality (example: the two units) of reflection surfaces 232 and 234, the size (the area) of the detection hole 40a may be decreased, when compared to a case of using the infrared ray detecting apparatus 100, that is, the infrared ray detecting apparatus 100 having applied with the reflecting mirror 130 having the one reflection surface 132.

To reduce the effect of an electromagnetic wave, the size of the detection hole 40a formed at the inner case 40 is designed in small size thereof, if possible. If the size of the detection hole 40a is large, as a result of the leakage of the electromagnetic wave, the infrared ray sensor may malfunction. Thus, in a case of using the reflecting mirror 230 having the plurality (example: the two units) of reflection surfaces 232 and 234, when compared to a case of using the reflecting mirror 130 having the one reflection surface 132, the effect of the electromagnetic wave may be reduced.

Figure 11A:
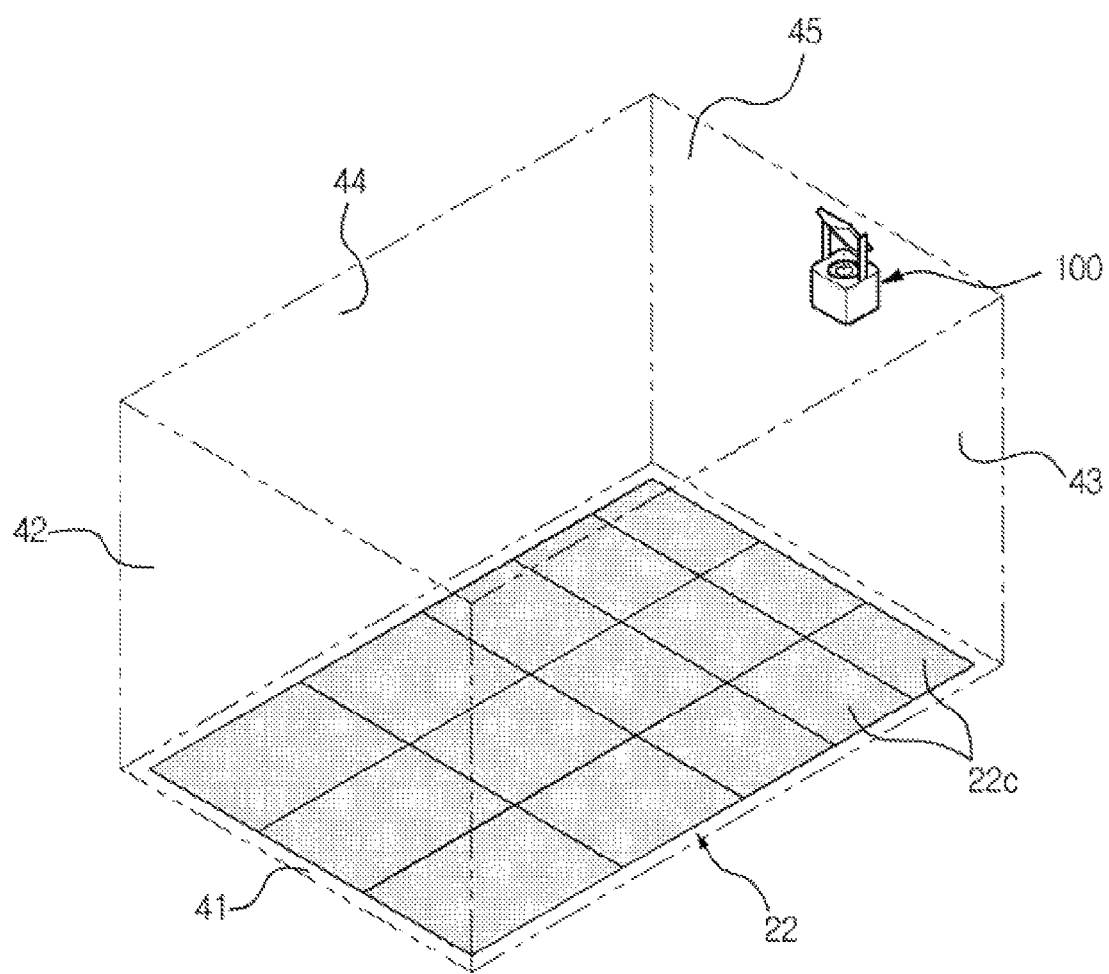
FIG. 11A is a drawing provided to describe the size of an unit detection domain in a case when detecting an infrared ray by using the infrared ray detecting apparatus of FIG. 3.
Figure 11B:
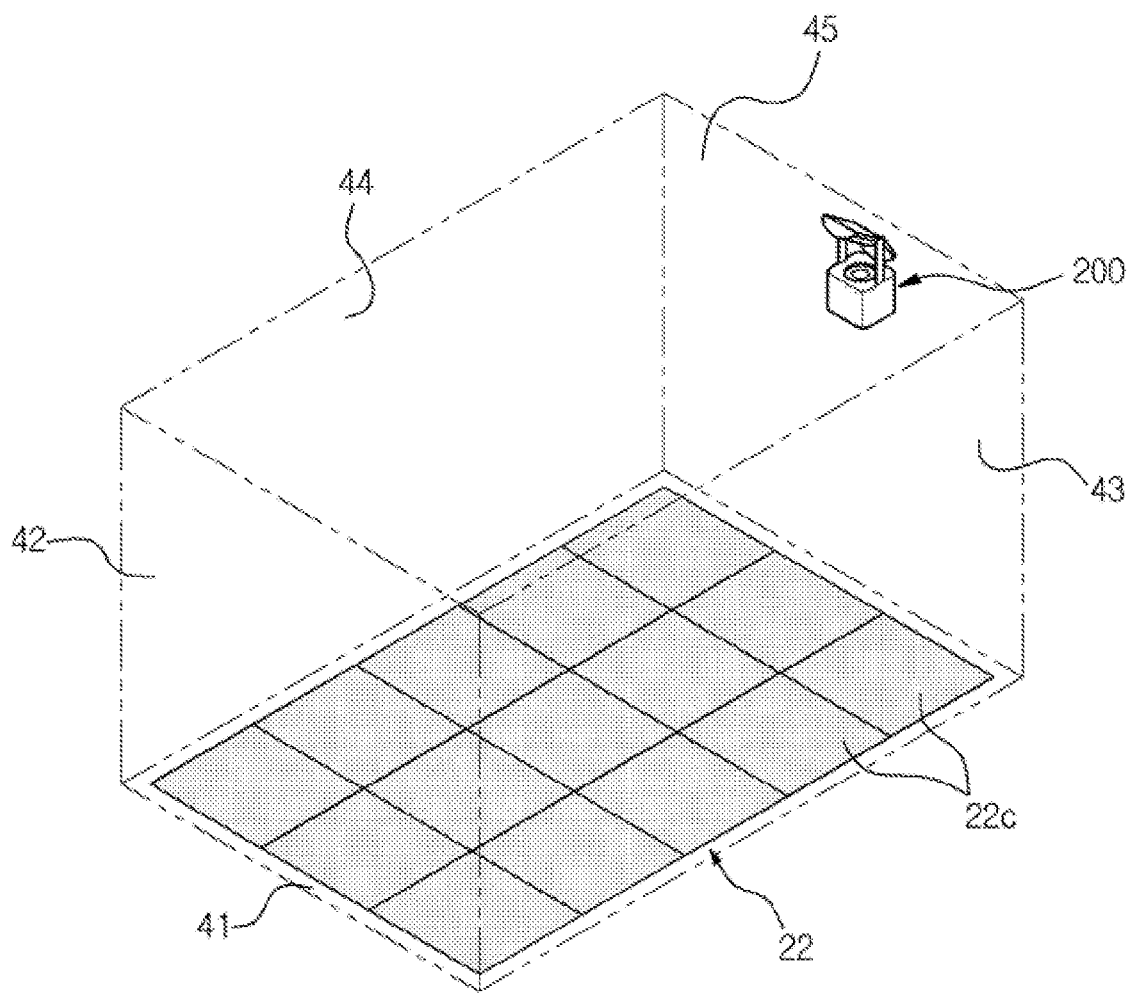
FIG. 11B is a drawing provided to describe the size of an unit detection domain in a case when detecting an infrared ray by using the infrared ray detecting apparatus of FIG. 6.

FIG. 11A is a drawing provided to describe the size of an unit detection domain in a case when detecting an infrared ray by using the infrared ray detecting apparatus of FIG. 3, and FIG. 11B is a drawing provided to describe the size of an unit detection domain in a case when detecting an infrared ray by using the infrared ray detecting apparatus of FIG. 6.

When detecting the infrared ray generated from the cooking compartment 20 by using the infrared ray detecting apparatus 100 in accordance with an embodiment of the present disclosure, that is, the infrared ray detecting apparatus 100 having applied with the reflecting mirror 130 provided with the one reflection surface 132, as described earlier, the infrared ray signal generated from the detection domain 22 having a close distance to the infrared ray detecting apparatus 100 is reflected by a point of the reflection surface 132 that is close to the infrared ray sensor 120, and then is received by the infrared ray sensor 120, and the infrared ray signal generated at the detection domain 22 having a far distance from the infrared ray detecting apparatus 100 is reflected by a point of the reflection surface 132 that is far from the infrared ray sensor 120, and is received by the infrared ray sensor 120. Thus, as illustrated on FIG. 11A, the size of a unit detection domain 22C that corresponds to the detection domain 22, which is close to the infrared ray detecting apparatus 100 in terms of distance, is smaller than the size of a unit detection domain 22C that corresponds to the detection domain 22, which is far from the infrared ray detecting apparatus 100 in terms of distance. That is, assuming that the entire domain of the bottom surface of the cooking compartment 20 is composed of the 'N' number (N≥2) of the unit detection domains 22C, the size of each unit detection domain 22C is not uniform with respect to each other.

Meanwhile, with respect to a case of detecting the infrared ray generated at the cooking compartment 20 by using the infrared ray detecting apparatus 200 in accordance with an embodiment of the present disclosure, that is, the infrared ray detecting apparatus 200 having applied with the reflecting mirror 230 provided with the plurality (example: the two units) of reflection surfaces 232 and 234, the infrared ray signal generated from the detection domain 22 having a close distance to the infrared ray detecting apparatus 100 is reflected by the first reflection surface 232 that is far from the infrared ray sensor 220, and then is received by the infrared ray sensor 220. Meanwhile, the infrared ray signal generated from the detection domain 22 having a far distance from the infrared ray detecting apparatus 100 is reflected by the second reflection surface 234 that is close to the infrared ray sensor 220, and then is received at the infrared ray sensor 220. That is, the inclination and the position of the respective reflection surfaces 232 and 234 are adjusted such that the infrared ray signal generated from the detection domain having a far distance from the reflecting mirror 230 is reflected by the reflection surface 234 that is close to the infrared ray sensor 220, and the infrared ray signal generated from the detection domain having a close distance to the reflecting mirror 230 is reflected by the reflection surface 232 that is far from the infrared ray sensor 220.

Thus, as illustrated on FIG. 11B, the size of a unit detection domain 22C that corresponds to the detection domain 22, which is close to the infrared ray detecting apparatus 200 in terms of distance, as well as the size of an unit detection domain 22C that corresponds to the detection domain 22, which is far from the infrared ray detecting apparatus 200 in terms of distance, is relatively uniform. That is, in a case of using the reflecting mirror 230 having the plurality (example: the two units) of reflection surfaces 232 and 234, assuming that the entire domain of the bottom surface of the cooking compartment 20 is composed of the 'N' number (N≥2) of the unit detection domains 22C, each unit detection domain 22C may be formed in a relatively uniform size with respect to each other.

The unit detection domain 22C, a temperature of which is detected by one infrared ray detecting device (not shown) among the plurality of infrared ray detecting devices (not shown) disposed at the inside of the infrared ray sensors 120 and 220, is formed in a relatively uniform size (the area), because in a case when the size of the unit detection domain 22C is not uniform, the accuracy of the temperature of the food detected through the infrared ray sensors 120 and 220 may be reduced. Thus, in a case of using the reflecting mirror 230 having the plurality (example: the two units) of reflection surfaces 232 and 234, when compared to a case of using the reflecting mirror 130 having the one reflection surface 132, the accuracy in detecting the temperature of the food may be enhanced. That is, in a case of using the reflecting mirror 230 having the plurality (example: the two units) of reflection surfaces 232 and 234, regardless of where the food is placed at any position on the entire detection domain 22 inside the cooking compartment 20, the temperature of the food may be relatively detected.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. A heating cooker, comprising:
a body of the heating cooker;
an inner case disposed at an inside of the body, and provided at an inside thereof with a cooking compartment at which food is being cooked, a detection hole being formed at a wall of one side of the inner case, and configured to allow an infrared ray generated at the cooking compartment to be released to an outside of the cooking compartment; and
an infrared ray detecting apparatus located outside of the cooking compartment and optically aligned with the detection hole, the infrared ray detecting apparatus comprising:
a reflecting mirror, which is fixed with respect to the heating cooker, comprising a plurality of reflection surfaces which are on different planes and configured to change a path of an incident infrared ray, and an infrared ray sensor configured to receive the incident infrared ray having the path thereof changed to detect an intensity of the received incident infrared ray, the incident infrared ray being received by the infrared ray sensor directly from the plurality of reflection surfaces of the reflecting mirror, wherein the infrared ray sensor includes a plurality of infrared ray detection devices, wherein a bottom surface of the cooking compartment includes a plurality of infrared ray detection domains corresponding to the plurality of infrared ray detection devices, respectively, and wherein at least one of the plurality of reflection surfaces of the reflecting mirror is a convex surface that is cylindrically shaped which reflects the incident infrared ray from one of the plurality of infrared ray detection domains directly to the infrared ray sensor.

2. The heating cooker of claim 1, wherein:

the detection hole is formed through one of a left side wall, a right side wall, a rear side wall, and an upper side wall of the inner case.

3. The heating cooker of claim 1, wherein:

each of the plurality of reflection surfaces has a constant curvature.

4. The heating cooker of claim 1, wherein:

each of the plurality of reflection surfaces is configured to change a path of the infrared ray being incident from a different infrared ray detection domain.

5. The heating cooker of claim 1, wherein:

the infrared ray sensor comprises:

a light receiving unit configured to receive the infrared ray being reflected from the plurality of reflection surfaces; and a plurality of detection devices disposed at a lower side of the light receiving unit, and configured to generate a detection output that corresponds to the intensity of the received infrared ray.

6. The heating cooker of claim 1, wherein each of the plurality of reflection surfaces has a flat surface.

7. A heating cooker, comprising:

a body of the heating cooker;

an inner case disposed at an inside of the body, and provided at an inside thereof with a cooking compartment at which food is being cooked, a detection hole being formed at a wall of one side of the inner case, and configured to allow an infrared ray generated at the cooking compartment to be released to an outside of the cooking compartment; and an infrared ray detecting apparatus located outside of the cooking compartment and optically aligned with the detection hole, the infrared ray detecting apparatus comprising:

a reflecting mirror, which is fixed with respect to the heating cooker, comprising a plurality of reflection surfaces which are on different planes and configured to change a path of an incident infrared ray, and an infrared ray sensor configured to receive the incident infrared ray having the path thereof changed to detect an intensity of the received incident infrared ray, the incident infrared ray being received by the infrared ray sensor directly from the plurality of reflection surfaces of the reflecting mirror, wherein the infrared ray sensor includes a plurality of infrared ray detection devices, wherein a bottom surface of the cooking compartment includes a plurality of infrared ray detection domains corresponding to the plurality of infrared ray detection devices, respectively, wherein at least one of the plurality of reflection surfaces of the reflecting mirror is a convex surface that is cylindrically shaped, and wherein the reflecting mirror further comprises a first reflection surface and a second reflection surface, and an inclination and a position of each of the first reflection surface and the second reflection surface are adjusted, so that an infrared ray being delivered from a first detection domain, which is close to the reflecting mirror, among all of the infrared ray detection domains, is reflected by the first reflection surface disposed at a far distance from the infrared ray sensor, and another infrared ray being delivered from a second detection domain, which is far from the reflecting mirror, among all of the infrared ray detection domains, is reflected by the second reflection surface disposed at a close distance from the infrared ray sensor.

8. The heating cooker of claim 7, wherein:

an intersection exists between a first infrared ray signal generated from the first detection domain and incident onto the first reflection surface, and a second infrared ray signal generated from the second detection domain and incident onto the second reflection surface.

* * * * *